(12) United States Patent
Wheelwright et al.

(10) Patent No.: US 11,774,737 B2
(45) Date of Patent: Oct. 3, 2023

(54) FOLDED-BEAM, LOW-OBLIQUITY BEAM SCANNER

(71) Applicant: META PLATFORMS TECHNOLOGIES, LLC, Menlo Park, CA (US)

(72) Inventors: Brian Wheelwright, Sammamish, WA (US); Daniel Guenther Greif, Redmond, WA (US); Kieran Connor Kelly, Seattle, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 341 days.

(21) Appl. No.: 16/796,385

(22) Filed: Feb. 20, 2020

(65) Prior Publication Data
US 2021/0173190 A1 Jun. 10, 2021

Related U.S. Application Data

(60) Provisional application No. 62/944,816, filed on Dec. 6, 2019.

(51) Int. Cl.
*G02B 21/00* (2006.01)
*G02F 1/1335* (2006.01)
(Continued)

(52) U.S. Cl.
CPC ..... *G02B 21/0048* (2013.01); *G01N 21/8806* (2013.01); *G02B 7/1821* (2013.01); *G02F 1/133536* (2013.01)

(58) Field of Classification Search
CPC .............. G02B 21/0048; G02B 7/1821; G01N 21/8806; G02F 1/133536
(Continued)

(56) References Cited

U.S. PATENT DOCUMENTS 9,971,150 B1   5/2018  Robbins
10,175,489 B1*  1/2019  Robbins .............. G02B 6/0016
(Continued)

FOREIGN PATENT DOCUMENTS

EP    3163356      5/2017
WO    2010127694   11/2010

OTHER PUBLICATIONS

PCT/US2020/062526 Search Report dated Mar. 12, 2021.
(Continued)

*Primary Examiner* — Joseph P Martinez
*Assistant Examiner* — Mitchell T Oestreich
(74) *Attorney, Agent, or Firm* — Pequignot + Myers; Matthew A. Pequignot

(57) ABSTRACT

A beam scanner includes a substrate, a tiltable reflector hingedly supported by the substrate, and a reflective polarizer. The reflective polarizer is supported over the tiltable reflector and configured to receive and redirect a light beam towards the tiltable reflector for scanning the light beam. A projector includes the beam scanner and a light source providing a light beam. The light beam may be modulated in brightness, color, or polarization synchronously with tilting the reflector, thereby forming an image in angular domain after propagating through a pupil-replicating waveguide. At least one folding mirror may be provided for directing the light beam from the light source around the pupil-replicating waveguide, resulting in a compact overall configuration.

13 Claims, 13 Drawing Sheets

(51) Int. Cl.
    *G02B 7/182*    (2021.01)
    *G01N 21/88*    (2006.01)
(58) Field of Classification Search
    USPC ...................................................... 359/212.1
    See application file for complete search history.

(56) References Cited

U.S. PATENT DOCUMENTS

| | | |
|---|---|---|
| 2008/0225366 A1 | 9/2008 | Hudman et al. |
| 2017/0010473 A1 | 1/2017 | Ide |
| 2018/0004002 A1 | 1/2018 | Rong et al. |
| 2018/0120559 A1 | 5/2018 | Yeoh et al. |

OTHER PUBLICATIONS

International Preliminary Report on Patentability for International Application No. PCT/US2020/062526, dated Jun. 16, 2022, 8 pages.

* cited by examiner

FOLDED-BEAM, LOW-OBLIQUITY BEAM SCANNER

REFERENCE TO RELATED APPLICATION

The present application claims priority from U.S. provisional patent application No. 62/944,816 entitled "Folded-Beam, Low-Obliquity Beam Scanner", filed on Dec. 6, 2019, and incorporated herein by reference in its entirety.

TECHNICAL FIELD

The present disclosure relates to optical scanning devices, and in particular to compact optical scanning devices usable in scanning projectors and scanning projector displays.

BACKGROUND

Head mounted displays (HMD), helmet mounted displays, near-eye displays (NED), and the like are being used increasingly for displaying virtual reality (VR) content, augmented reality (AR) content, mixed reality (MR) content, etc. Such displays are finding applications in diverse fields including entertainment, education, training and biomedical science, to name just a few examples. The displayed VR/AR/MR content can be three-dimensional (3D) to enhance the experience and to match virtual objects to real objects observed by the user. Eye position and gaze direction, and/or orientation of the user may be tracked in real time, and the displayed imagery may be dynamically adjusted depending on the user's head orientation and gaze direction, to provide an experience of immersion into a simulated or augmented environment.

Compact display devices are desired for head-mounted displays. Because a display of HMD or NED is usually worn on the head of a user, a large, bulky, unbalanced, and/or heavy display device would be cumbersome and may be uncomfortable for the user to wear.

Projector-based displays provide images in angular domain, which can be observed by a user's eye directly, without an intermediate screen or a display panel. An imaging waveguide may be used to extend image light carrying the image in angular domain over an eyebox of the display. The lack of a screen or a display panel in a scanning projector display enables size and weight reduction of the display. Projector-based displays may use a scanning projector that obtains image in angular domain by scanning an image light beam of a controllable brightness and/or color. It is desirable to make scanning projectors and optical scanners more compact.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
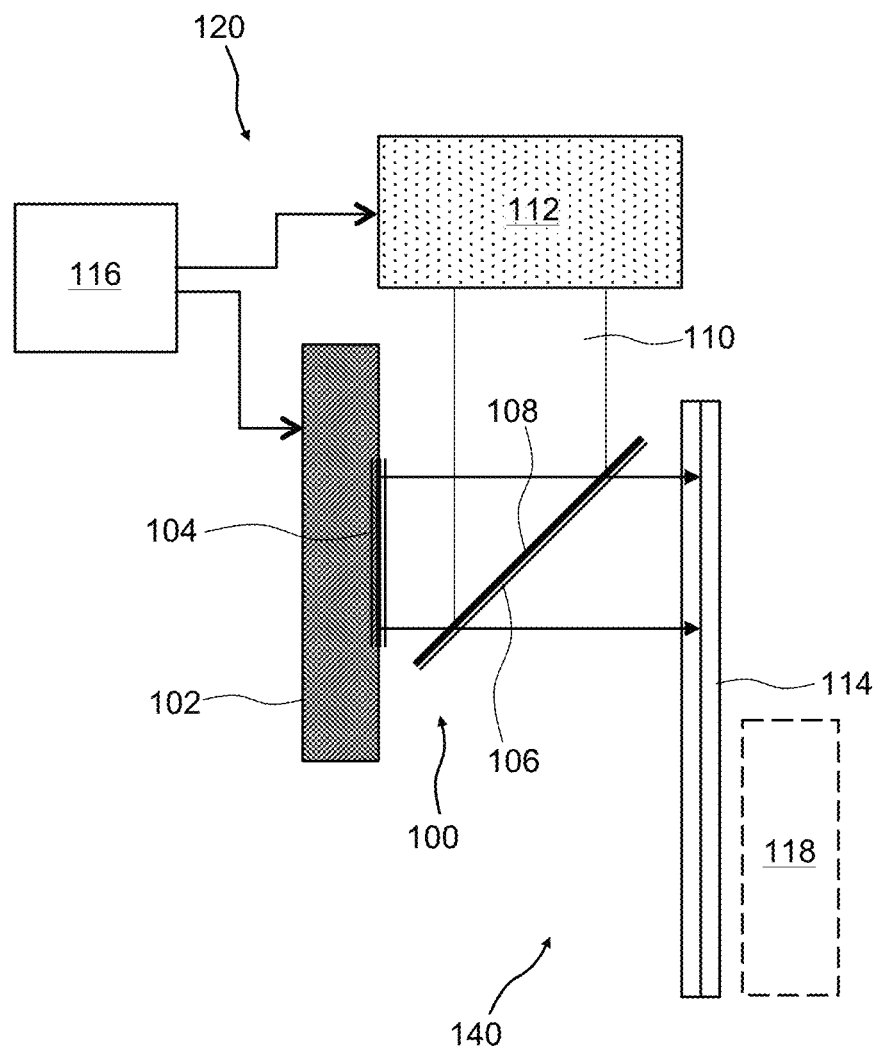
FIG. 1 is a side cross-sectional view of a beam scanner including a reflective polarizer.
Figure 2:
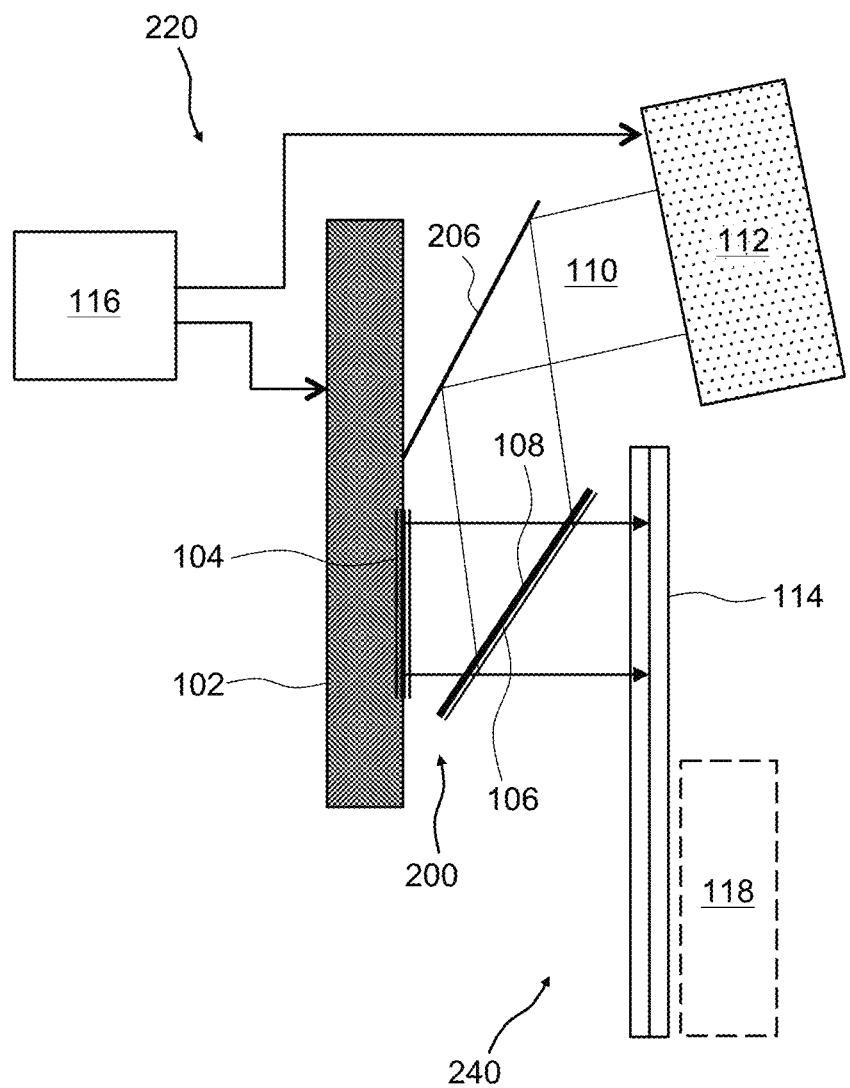
FIG. 2 is a side cross-sectional view of a beam scanner including a reflective polarizer and a beam-folding mirror.
Figure 3A:
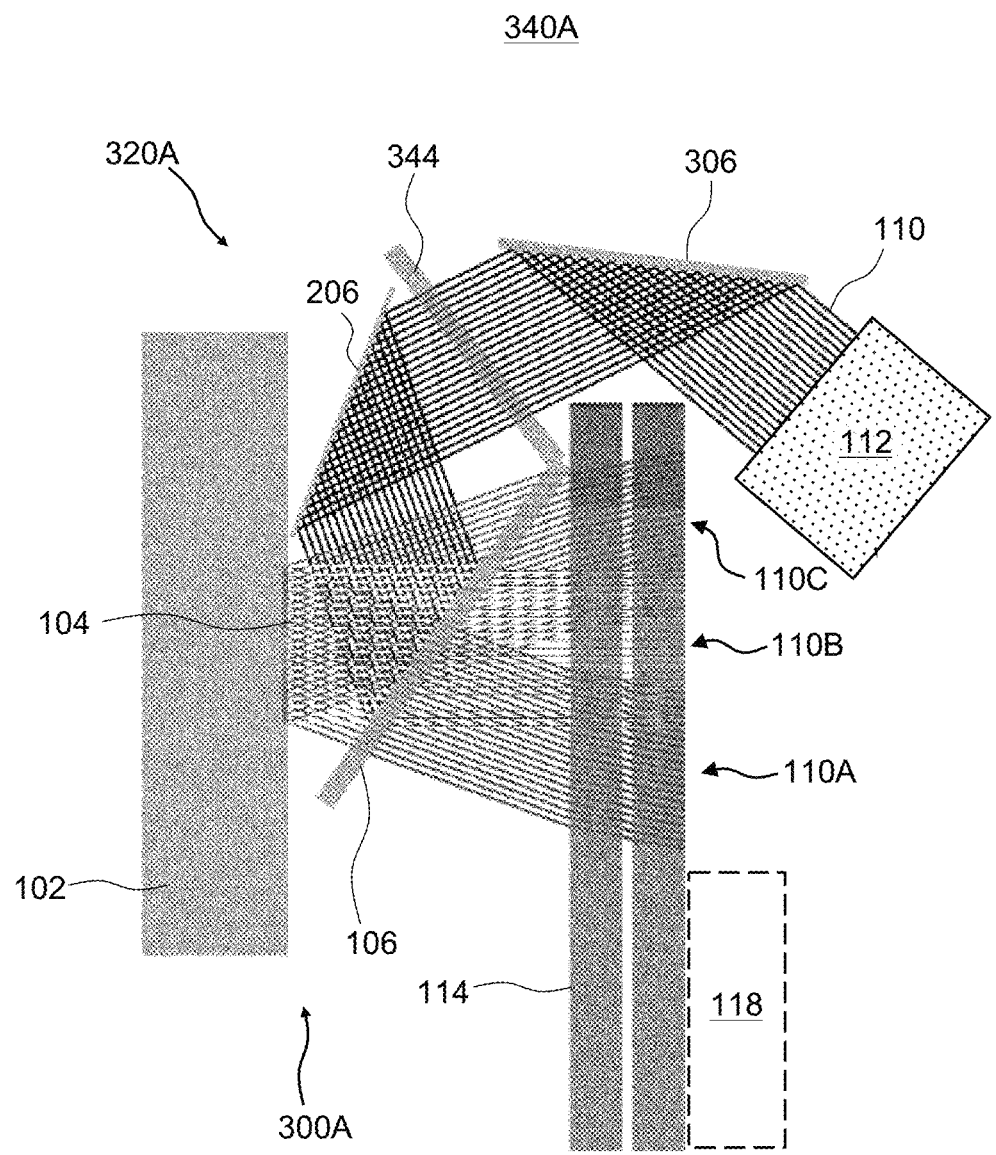
FIG. 3A is a side cross-sectional view of a beam scanner including a reflective polarizer and a pair of beam-folding mirrors for routing an optical beam around an image-replicating waveguide.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1, 2, and FIG. 3A, similar reference numerals denote similar elements.

A tiltable reflector may be used to scan a light beam emitted by a light source to form an image in angular domain for direct observation by a user of a display. As the light beam is scanned, the brightness and/or color of the scanned light beam may be varied in coordination with the scanning. The brightness and/or color of the light beam are set to correspond to brightness and/or color of image pixels being currently highlighted or "painted" by the light beam. The entire image is formed when the light beam is scanned in two dimensions, e.g. over X- and Y-viewing angles, over the entire field of view (FOV) of the user. When the frame rate is high enough, the eye integrates the scanned light beam, enabling the user to see the displayed imagery substantially without flicker.

One problem associated with beam scanners is a reduction of field of view (FOV) caused by an oblique angle of incidence of the light beam onto a tiltable reflector of the beam scanner. The oblique incidence angle may be required by the optical geometry used, e.g. to physically separate an impinging light beam from the scanned reflected light beam. The FOV reduction is caused by distortion of the solid angle representing the range of scanning at oblique angles of incidence of light beam at the tiltable reflector.

In accordance with the present disclosure, the output (scanned) light beam may be spatially separated from the input optical beam by polarization. This obviates the need in geometrical separation of the beams by oblique angles of incidence, resulting in a compact configuration providing a nearly straight angle of incidence at the tiltable reflector when the latter is in a center (non-tilted) angular position. Low obliquity of the impinging light beam enables the scanning range to be utilized more efficiently.

In accordance with this disclosure, there is provided a beam scanner comprising a substrate, a tiltable reflector hingedly supported by the substrate, and a reflective polarizer supported over the tiltable reflector and configured to receive and redirect a light beam towards the tiltable reflector for scanning the light beam. A quarter-wave waveplate (QWP) may be provided in an optical path between the reflective polarizer and the tiltable reflector. The QWP may be configured to change a polarization state of the light beam to an orthogonal polarization state upon double pass propagation of the light beam through the QWP. The QWP may be supported by the reflective polarizer.

In some embodiments, the beam scanner may further include a folding mirror configured to receive and redirect the light beam towards the reflective polarizer. The folding mirror may be supported by the substrate. An enclosure enclosing the tiltable reflector may be provided. The enclosure may support the reflective polarizer. In embodiments where the folding mirror is supported by the substrate and optically coupled to the reflective polarizer, the enclosure may include an optical window for receiving and transmitting the light beam through the optical window for impinging onto the folding mirror.

In accordance with this disclosure, there is provided a projector comprising a light source and a beam scanner. The light source may be configured for providing a light beam having a characteristic comprising at least one of brightness or color. The beam scanner may include a substrate, a tiltable reflector hingedly supported by the substrate, and a reflective polarizer supported over the tiltable reflector and configured to receive and redirect the light beam towards the tiltable reflector for scanning the light beam.

In some embodiments, the projector may further include a QWP in an optical path between the reflective polarizer and the tiltable reflector. The QWP may be configured to change a polarization state of the light beam to an orthogonal polarization state upon double pass propagation of the light beam through the QWP. A first folding mirror may be configured to receive and redirect the light beam towards the reflective polarizer. The first folding mirror may be supported by the substrate. A second folding mirror may be configured to receive and redirect the light beam towards the first folding mirror. An enclosure enclosing the tiltable reflector may be provided. The enclosure may support the reflective polarizer, and may include an optical window for receiving and transmitting the light beam therethrough for impinging onto the first folding mirror. A controller may be operably coupled to the light source and the beam scanner for varying the characteristic of the light beam in coordination with scanning the light beam by the beam scanner.

In accordance with this disclosure, there is further provided a display comprising a light source for providing the light beam, a beam scanner described above, and a pupil-replicating waveguide configured to receive the light beam reflected from the tiltable reflector, and to spread the light beam over an eyebox of the display. The pupil-replicating waveguide may be disposed substantially parallel to the substrate of the beam scanner. A first folding mirror may be configured to receive and redirect the light beam towards the reflective polarizer. A second folding mirror may be configured to receive and redirect the light beam towards the first folding mirror and around the pupil-replicating waveguide.

Several embodiments of a beam scanner of this disclosure will now be considered. Referring to FIG. 1, a beam scanner 100 includes a substrate 102, e.g. a semiconductor substrate, and a tiltable reflector 104, e.g. a tiltable mirror and/or grating, hingedly supported by the substrate 102. A reflective polarizer 106 is supported over the tiltable reflector 104 and is optically coupled to the tiltable reflector 104. The reflective polarizer 106 may be configured to reflect a light beam 110 of a particular pre-defined polarization state towards the tiltable reflector 104, and to transmit light of an orthogonal polarization state. The light beam 110 impinging onto the tiltable reflector 104 may then be scanned about one or two axes. A quarter-wave waveplate (QWP) 108 may be disposed in an optical path between the reflective polarizer 106 and the tiltable reflector 104. The QWP 108 may be configured to change a polarization state of the light beam 110 to the orthogonal polarization state upon double pass propagation of the light beam 110 through the QWP 108. For example, the QWP 108 may be oriented with its optic axis at 45 degrees w.r.t. a polarization direction of a linearly polarized light beam 110, such that at double pass propagation, the QWP 108 acts as a half-wave waveplate rotating the linear polarization of the light beam 110 to an orthogonally oriented linear polarization. The QWP 108 may stand separately, or may be supported by the reflective polarizer 106, as shown—the latter configuration tends to be more compact.

A projector 120 includes the beam scanner 100 and a light source 112 optically coupled to the beam scanner 100. In operation, the light source 112 emits the light beam 110 having a controllable characteristic such as brightness, color, etc. The light beam 110 may be circularly polarized. The light beam 110 emitted by a light source 112 impinges onto the QWP 108. The QWP 108 is disposed and oriented to convert a circular polarization state into a linear polarization state that is reflected by the reflective polarizer 106. The reflected linearly polarized light beam 110 propagates again through the QWP 108 and becomes circularly polarized. The circularly polarized light beam 110 is reflected by the tiltable reflector 104 back towards the QWP 108. This reflection reverses the handedness of the circular polarization. Upon a third propagation of the light beam 110 through the QWP 108, the light beam 110 becomes linearly polarized at an orientation of the polarization vector that ensures transmission of the light beam 110 through the reflective polarizer 106. The transmitted light beam 110 propagates towards a pupil-replicating waveguide 114. The replicating waveguide 114 may include a single waveguide element or a stack of waveguide elements. The pupil-replicating waveguide 114 spreads the light beam 110 over an eyebox 118 of the near-eye display 140, thus carrying an image in angular domain to the eyebox 118. Substantially parallel placement of the substrate 102 and the pupil-replicating waveguide 114 may allow a further size reduction of the near-eye display 140.

A controller 116 may be operably coupled to the light source 112 and the beam scanner 100 and configured to vary the brightness and/or color of the light beam 110 in coordination with scanning the light beam 110 with the beam scanner 100. Together, the pupil-replicating waveguide 114, the light source 112, and the beam scanner 100 form a near-eye display 140.

Turning to FIG. 2, a projector 220 includes a beam scanner 200. The projector 220 and the beam scanner 200 are similar to the projector 120 and the beam scanner 100, respectively, of FIG. 1. The beam scanner 200 of FIG. 2 further includes a first folding mirror 206 in an optical path of the light beam 110 between the light source 112 and the tiltable reflector 104. The first folding mirror 206 may be supported by the substrate 102, may extend from the substrate 102, or may be mounted separately. First folding mirror 206 may be a mirrored prism or a thin mirrored substrate, for example. One advantage of utilizing the first folding mirror 206 is further size reduction of the beam scanner 200 due to the reflective polarizer 106 being disposed at a shallower angle than in the beam scanner 100 of FIG. 1. Another advantage of the beam scanner 200 is that the light source 112 may be disposed on the opposite side of the pupil-replicating waveguide 114, providing size savings for a near-eye display 240. Substantially parallel placement of the substrate 102 and the pupil-replicating waveguide 114 may allow a further size reduction of the near-eye display 240. Herein and throughout the rest of this disclosure, the term "substantially parallel" is taken to mean parallel to within 10-15 degrees, for certainty.

Referring to FIG. 3A, a beam scanner 300A is similar to the beam scanner 200 of FIG. 2. A projector 320A includes the light source 112 optically coupled to the beam scanner 300A by a second folding mirror 306 in an optical path of the light beam 110 between the light source 112 and the tiltable reflector 104. One advantage of utilizing two folding mirrors, i.e. the first folding mirror 206 and the second folding mirror 306, is a possibility of a further size reduction of the beam scanner 300A. Two folding mirrors 206 and 306 enable redirection of the light beam 110 around the pupil-replicating waveguide 114.

The beam scanner 300A may further include an optical window 344. Together with the reflective polarizer 106, the optical window 344 may provide an enclosure of the tiltable reflector 104 and the first folding mirror 206, enabling the tiltable reflector 104 to be hermetically packaged, if so required. In the projector 320A, the light beam 110 impinges onto the tiltable reflector 104 at zero angle of incidence, or at a small non-zero angle, when the tiltable reflector 104 is not tilted.

A near-eye display 340A includes the pupil-replicating waveguide 114 and the projector 320A optically coupled to the pupil-replicating waveguide 114. In operation, the tiltable reflector 104 is scanned about one or two axes of tilt. In FIG. 3A, the tiltable reflector 104 scans the light beam 110 about an axis perpendicular to the plane of FIG. 3A. A fan of three scanned beams, 110A, 110B, and 110C, is shown to illustrate the scanning.

Figure 3B:
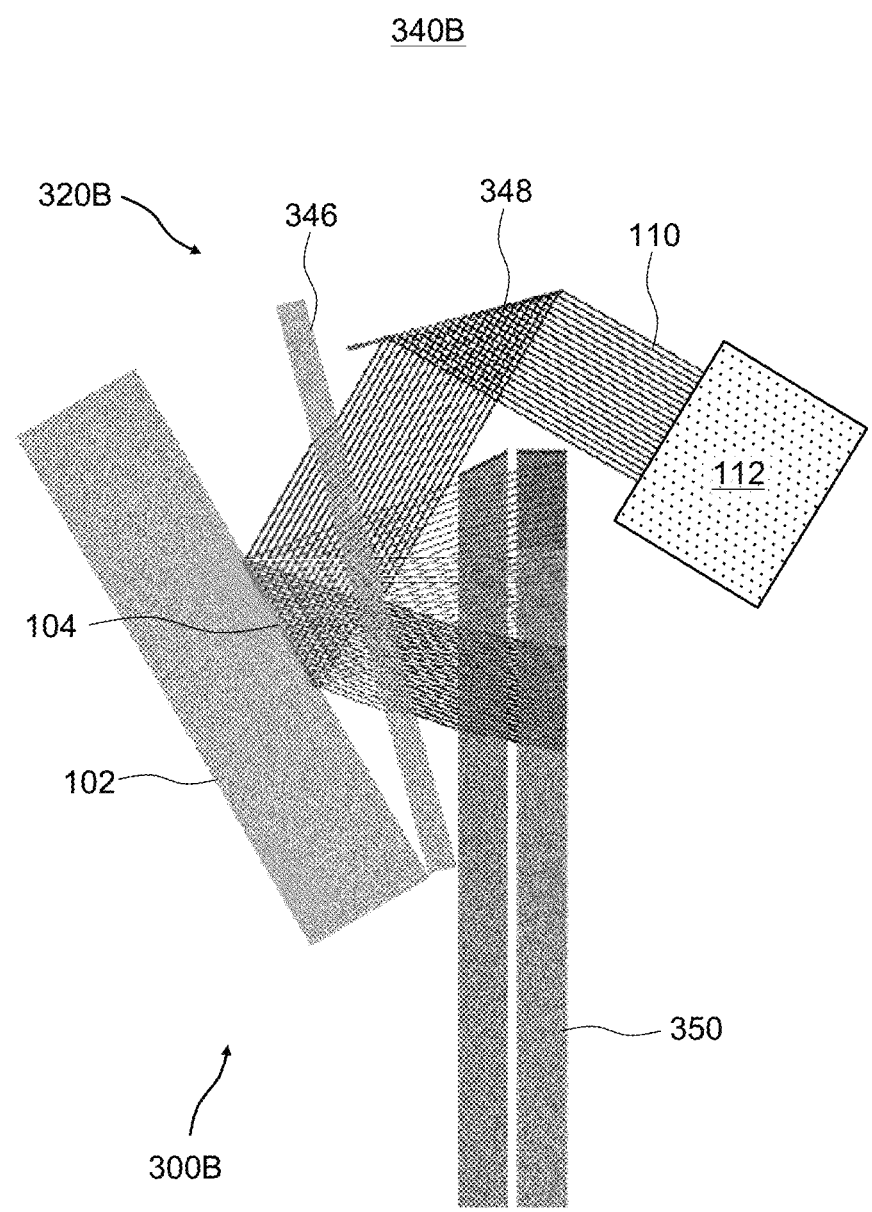
FIG. 3B is a side cross-sectional view of a non-zero obliquity beam scanner including a beam-folding mirror.

FIG. 3B depicts a beam scanner 300B that does not include internal folding mirrors or reflective polarizers. The beam scanner 300B is considered herein for comparison with the beam scanner 300A of FIG. 300A, to show the effects of oblique vs. normal angle of incidence of the light beam 110 onto the tiltable reflector 104 when the latter is at a nominal orientation, i.e. parallel to the substrate 102. The beam scanner 300B of FIG. 3B includes the tiltable reflector 104 hingedly supported over the substrate 102 and protected by a window 346. An external folding mirror 348 redirects the light beam 110 emitted by the light source 112 to impinge on to the tiltable reflector 104 through the window 346 at an oblique angle of incidence.

A projector 320B includes the light source 112 optically coupled to the beam scanner 300B by the external folding mirror 348 disposed in an optical path of the light beam 110 between the light source 112 and the tiltable reflector 104. A near-eye display 340B includes the tiltable reflector 104 and a pupil-replicating waveguide 350. The tiltable reflector 104 reflects the light beam 110 to impinge onto the pupil-replicating waveguide 350 at different angles of incidence. In the projector 320B, the light beam 110 impinges onto the tiltable reflector 104 at an oblique angle of incidence, i.e. away from the normal angle of incidence.

Figure 4A:
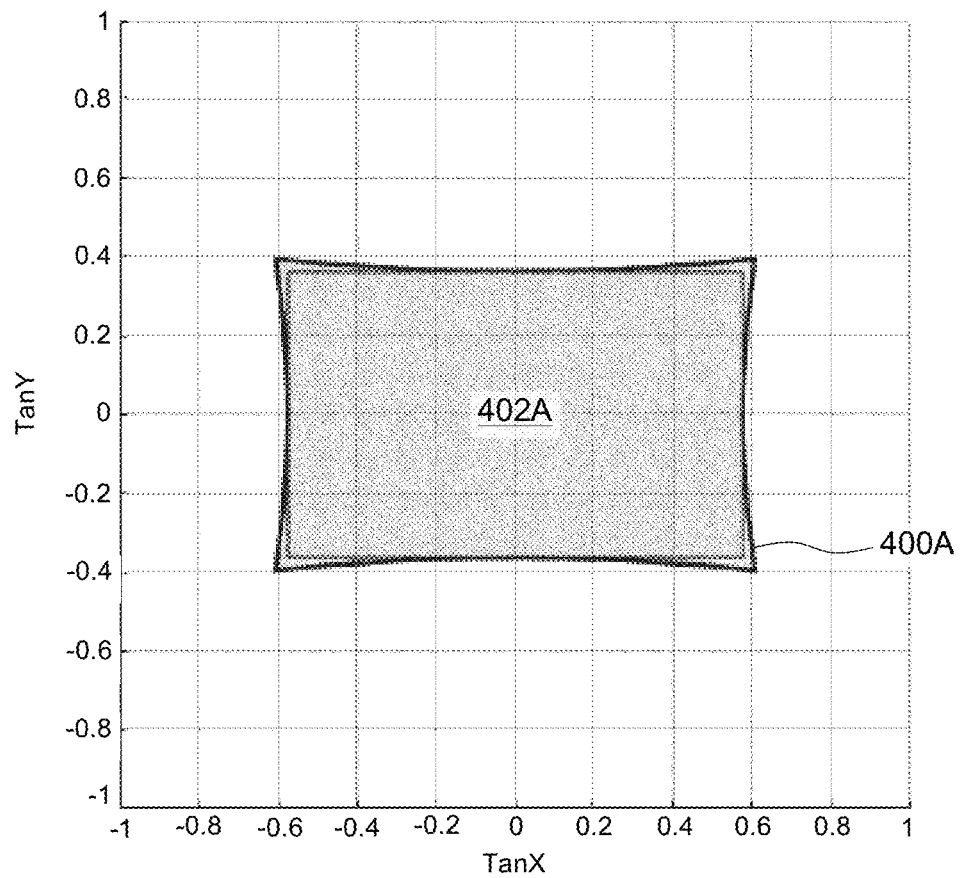
FIGS. 4A and 4B are field of view (FOV) plots of the beam scanners of FIGS. 3A and 3B, respectively.
Figure 4B:
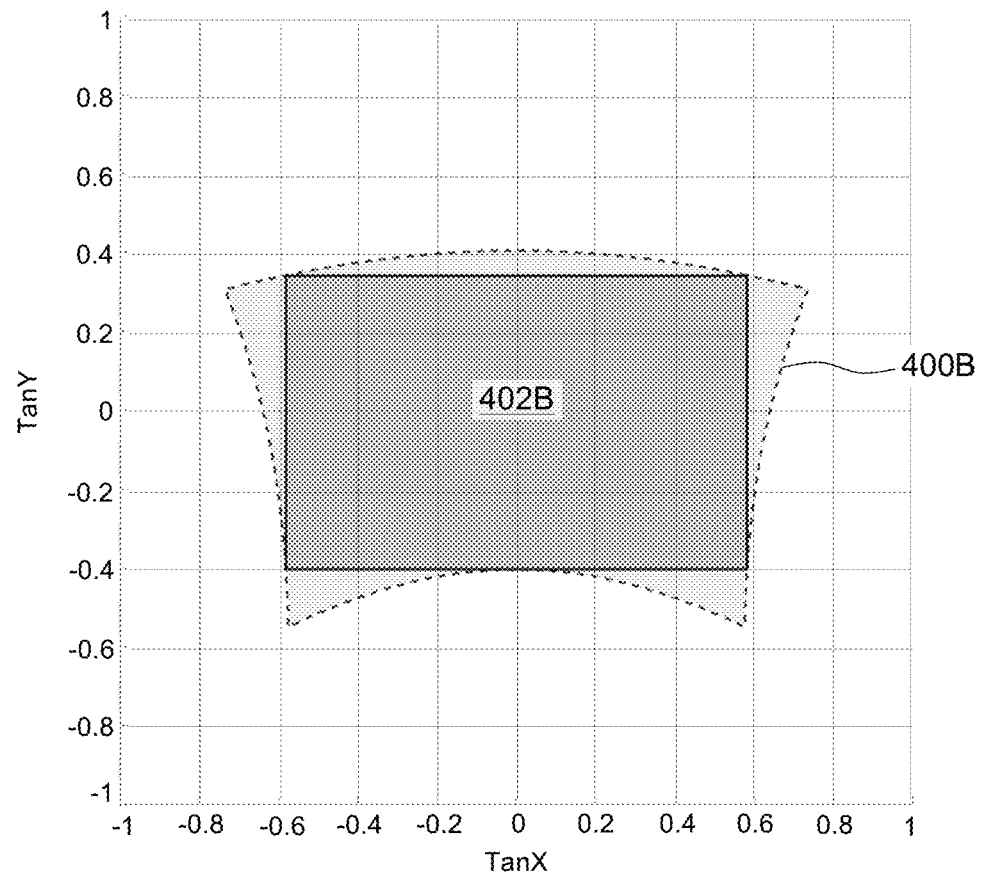

FIGS. 4A and 4B illustrate the effects of normal angle of incidence (FIG. 4A) vs. oblique angle of incidence (FIG. 4B) onto the tiltable reflector 104. FIG. 4A shows a zero-obliquity scanning angular area 400A and an associated inscribed rectangular FOV 402A (shaded rectangle) in units of tangents of corresponding ray angles θx and θy, Tan X and Tan Y respectively. The zero-obliquity FOV 402A solid angle is covering most of the angular area 400A. By comparison, FIG. 4B shows an oblique incidence scanning angular area 400B and an associated inscribed rectangular FOV 402B (shaded rectangle). The FOV 402B solid angle occupies a smaller percentage of the angular area 400B, and has a different aspect ratio. For example, to ensure an FOV of the near-eye display 340A of FIG. 3A, the tiltable reflector 104 needs to be tilted within a certain tilt ranges about X-axis and about Y-axis. To ensure the same FOV of the near-eye display 340B of FIG. 3B at a non-zero obliquity, the tiltable reflector 104 needs to have a larger tilt ranges about X- and Y-axes. Thus, the zero- or low-obliquity coupling of the light beam 110 to the tiltable reflector 104 improves the utilization of the scanning range of the tiltable reflector 104, enabling smaller scanning ranges of the tiltable reflector 104 and/or wider fields of view at the same scanning ranges of the tiltable reflector 104. It is to be noted that the configurations and advantages disclosed herein may be applicable to various types of projector-based displays, not necessarily near-eye displays.

Figure 5:
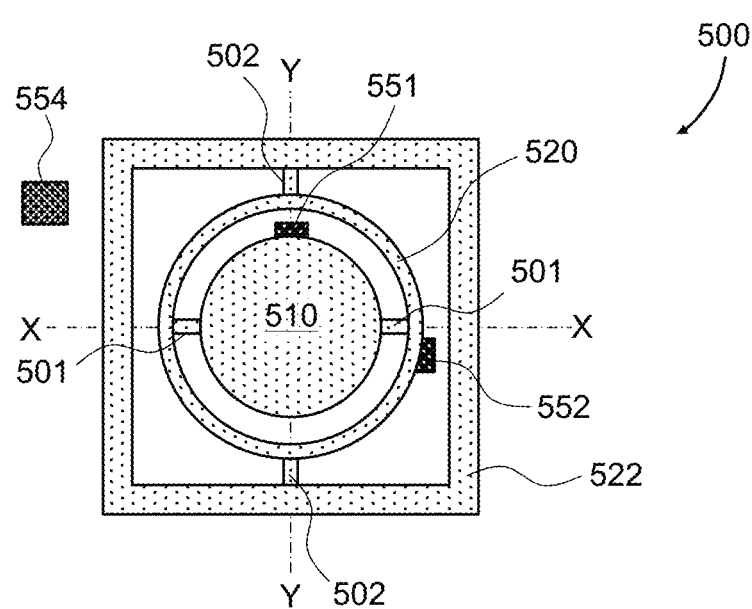
FIG. 5 is a plan view of a 2D scanning microelectromechanical system (MEMS) mirror.

In some embodiments, the beam scanners of the projectors described herein may include microelectromechanical system (MEMS) scanners. Referring to FIG. 5, a two-dimensional (2D) microelectromechanical system (MEMS) scanner 500 includes a reflector 510, e.g. a mirror or a diffraction grating, supported by a pair of first torsional hinges 501 allowing tilting the reflector 510 about X axis. The first torsional hinges 501 extend from the reflector 510 to a gimbal ring 520, which is supported by a pair of second torsional hinges 502 extending from the gimbal ring 520 to a fixed base 522, for tilting of the gimbal ring 520 and the reflector 510 about Y axis. Actuators 551, 552 may be disposed underneath the reflector 510 and/or the gimbal ring 520 for providing a force for actuating the tilt of the reflector 510 about X and Y axes. The actuators 551, 552 may be electrostatic, electro-magnetic, piezo-electric, etc. For electrostatic mirror actuation, the comb drive may be located on the torsional hinge members. For example, in the embodiment shown in FIG. 5, the first actuator 551 may be disposed under an edge of the reflector 510 to tilt the reflector 510 about X-axis. The second actuator 552 may be disposed under the gimbal ring 520 for tilting the gimbal ring 520 and the reflector 510 about Y-axis. It is noted that reflector 510 may be offset from a center of a corresponding substrate, if needed.

A feedback circuit 554 may be provided for determining the X- and Y-angles of tilt of the reflector 510. The feedback circuit 554 may measure electric capacitance between the first electrostatic actuator 551 and the reflector 510 to determine the X-tilt, and electric capacitance between the second electrostatic actuator 552 and the gimbal ring 520 to determine the Y-tilt. Separate electrodes may also be provided specifically for the feedback circuit 554. In some embodiments, the feedback circuit 554 may provide a sync or triggering pulses when the reflector 510 is tilted at a certain X- and/or Y-angle, including zero angle. The reflector 510 of FIG. 5 corresponds to the tiltable reflector 104 of FIGS. 1, 2, 3A, and 3B.

Figure 6A:
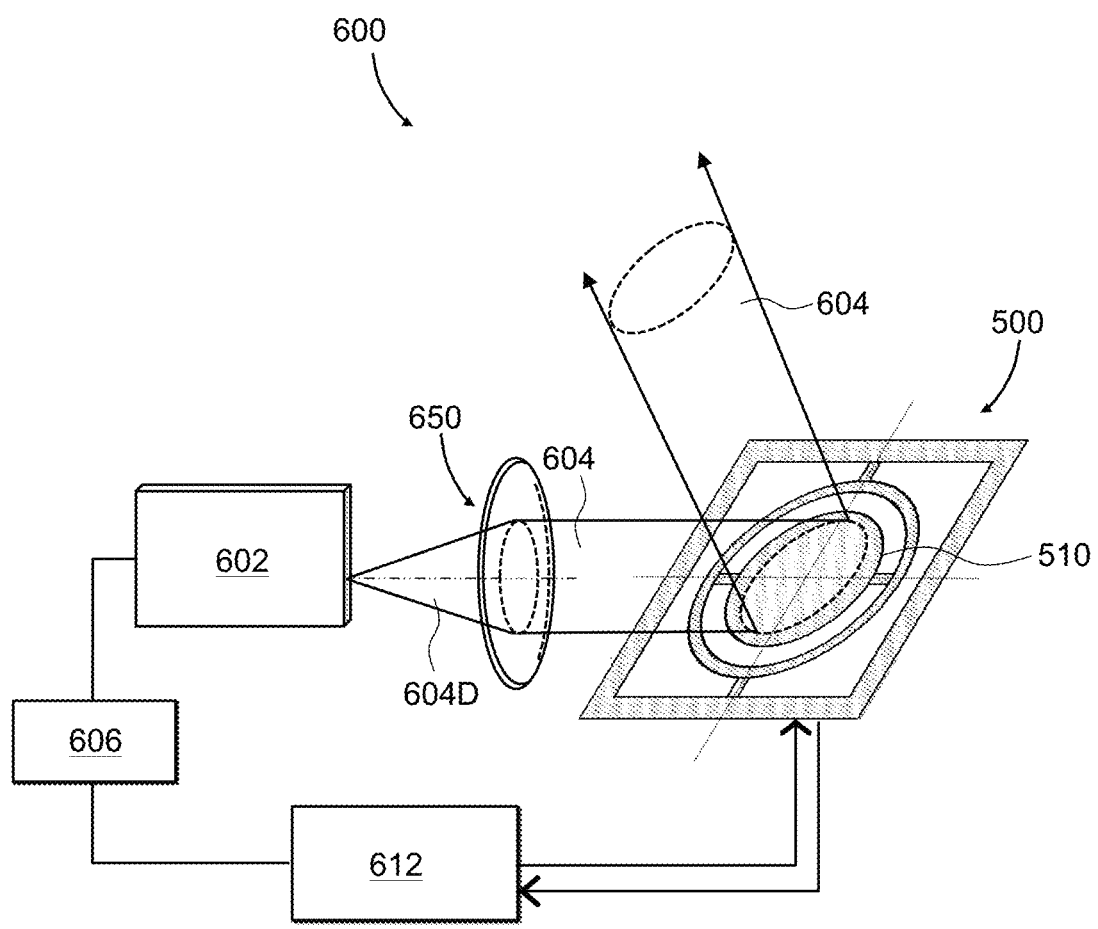
FIG. 6A is a schematic view of a microelectromechanical system (MEMS) scanning projector display.

Turning to FIG. 6A, a scanning projector display 600 includes a light source assembly 602 for providing a diverging optical beam 604D. An optional collimator 650 is optically coupled to the light source assembly 602, to collimate the diverging optical beam 604D and provide a collimated optical beam 604. A scanner, such as the 2D MEMS scanner 500 of FIG. 5, is optically coupled to the collimator 650. The controller 612 can be operably coupled to an electronic driver 606, which is coupled to the light source assembly 602. The controller 612 is also coupled to the 2D MEMS scanner 500 for tilting the reflector 510 of the 2D MEMS scanner 500.

The collimator 650, e.g. a lens, a mirror, etc., is optically coupled to the light source assembly 602 for collimating the diverging optical beam 604D to obtain the collimated optical beam 604. Any optical component having optical power, i.e. focusing or collimating power, such as a concave mirror, a diffractive lens, a folded-beam freeform optical element, etc., may be used in the collimator 650. The reflector 510 of the 2D MEMS scanner 500 is optically coupled to the collimator 650 for receiving and angularly scanning the collimated optical beam 604.

The electronic driver 606 is configured for providing powering electric pulses to energize the light source assembly 602. The controller 612 sends commands to the electronic driver 606 to energize the light source assembly 602 in coordination with tilting the 2D MEMS scanner 500, for "painting" or rastering an image in angular domain. When viewed by a human eye, the image in angular domain is projected by the eye's cornea and lens to become a spatial-domain image on the eye's retina.

In some embodiments, the scanner of the projector display may include a 1D tiltable mirror, and the light source assembly 602 may include a linear array of light sources to provide a plurality of image pixels in a direction perpendicular to the direction of scanning. The linear array of light sources may also be used in a 2D scanner, as well. In some embodiments, the 2D MEMS scanner 500 may be replaced with a pair of 1D tiltable mirrors, one for scanning about X axis, and the other for scanning about Y axis. The two 1D tiltable mirrors may be optically coupled, e.g. via a pupil relay. Other types of scanners may be used, for example diffractive or acousto-optic scanners.

The light source assembly 602 may include one or a plurality of single-mode or multimode light sources, e.g. side-emitting laser diodes, vertical-cavity surface-emitting laser diodes, superluminescent light-emitting diodes (SLEDs), or light-emitting diodes. The pulse energy of the light pulse may be selected to be lower than a threshold energy equal to the pixel time interval multiplied by a threshold optical power of the light source. For SLED light sources, the threshold optical power of the SLED may be a lasing threshold optical power of the SLED.

Figure 6B:
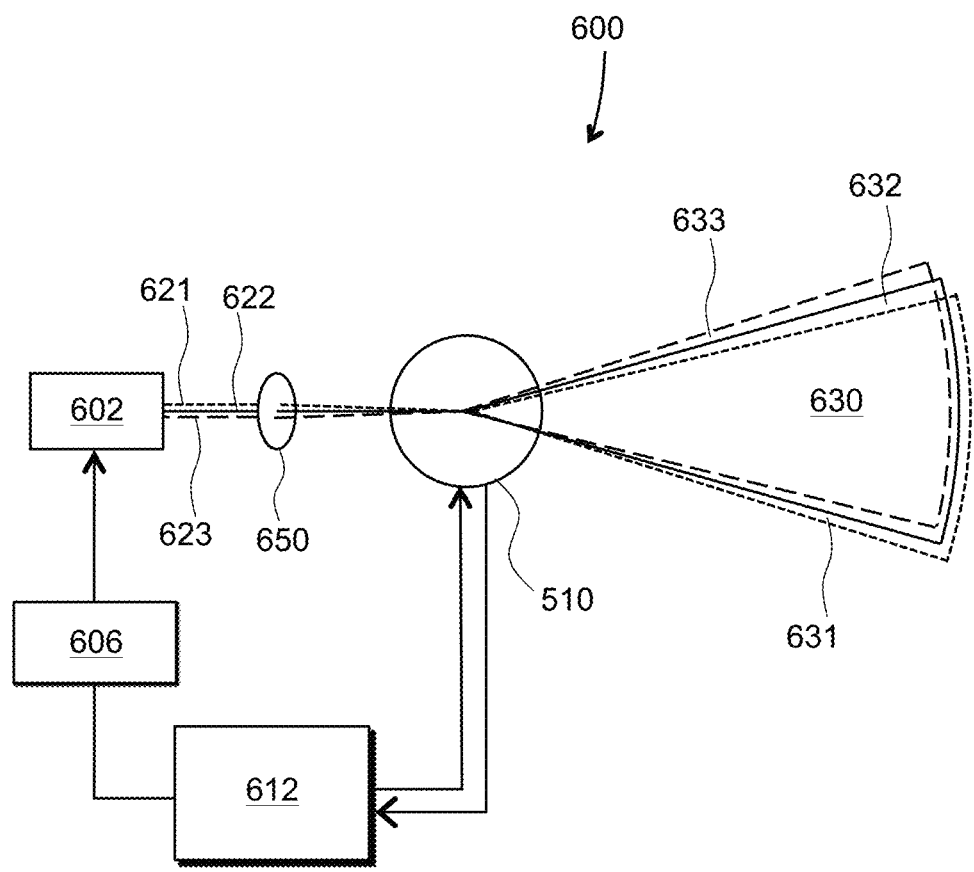
FIG. 6B is a schematic top view of a scanning projector display with an arrayed light source, illustrating a relationship between fields of view provided by individual emitters of the arrayed light source.

The operation of the scanning projector display 600 is further illustrated in FIG. 6B. In this example, the light source assembly 602 is a multi-emitter assembly including three emitters providing three beams (only chief rays shown) 621 (dotted lines), 622 (solid lines), and 623 (dashed lines). The collimator 650 collimates the beams 621, 622, and 623. By selecting suitable geometry e.g. distances and focal length of the collimator 650, the latter may also cause the beams 621, 622, and 623 to impinge onto a center of the reflector 510 at slightly different angles of incidence, for scanning all three beams 621, 622, and 623 together. Since the angles of incidence of the beams 621, 622, and 623 onto the tiltable reflector 510 are different, respective scanning areas 631 (dotted lines), 632 (solid lines), and 633 (dashed lines) of the beams 621, 622, and 623, respectively, are mutually offset as shown. The controller 612 may take these spatial offsets into account by providing corresponding delays to the driving signals of the three emitters of the multi-emitter light source assembly 602. Spatial offsets in combination with the delays in energizing individual emitters may be provided such as to effectively triple the spatial resolution of the scanning projector display 600 in a common scan area 630, as compared to a case of a single emitter.

Figure 7:
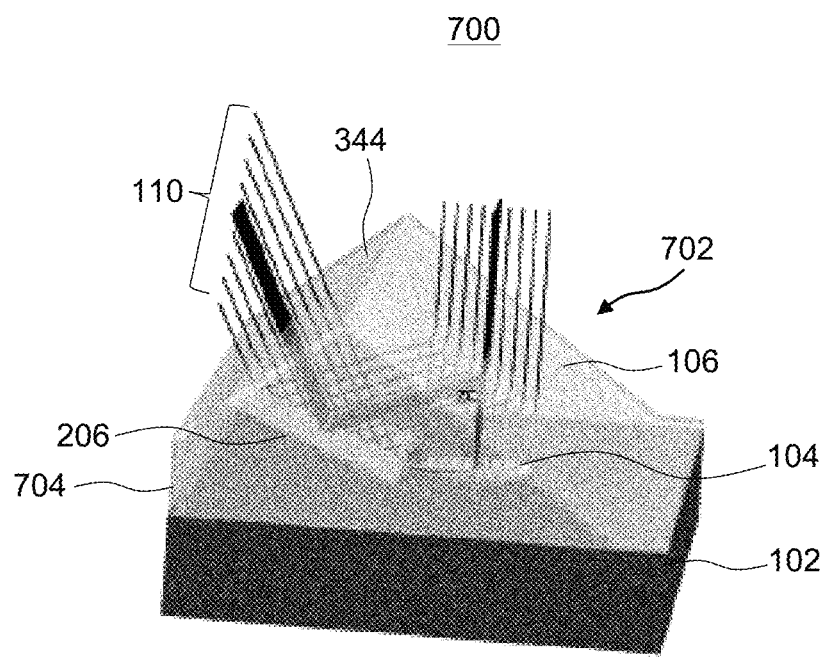
FIG. 7 is a three-dimensional view of a packaged beam scanner of FIG. 3A.

Referring now to FIG. 7, a packaged MEMS scanner 700 has the optical configuration of the beam scanner 300A of FIG. 3A, and operates similarly to the beam scanner 300A. The packaged MEMS scanner 700 (FIG. 7) includes a hermetic package or enclosure 702 formed by the reflective polarizer 106, the optical window 344, and side walls 704. The enclosure 702 encapsulates the tiltable reflector 104 and the first folding mirror 206. The enclosure 702 may be vacuum sealed or filled with an inert gas such as argon, to provide a stable environment for the tiltable reflector 104.

Figure 8:
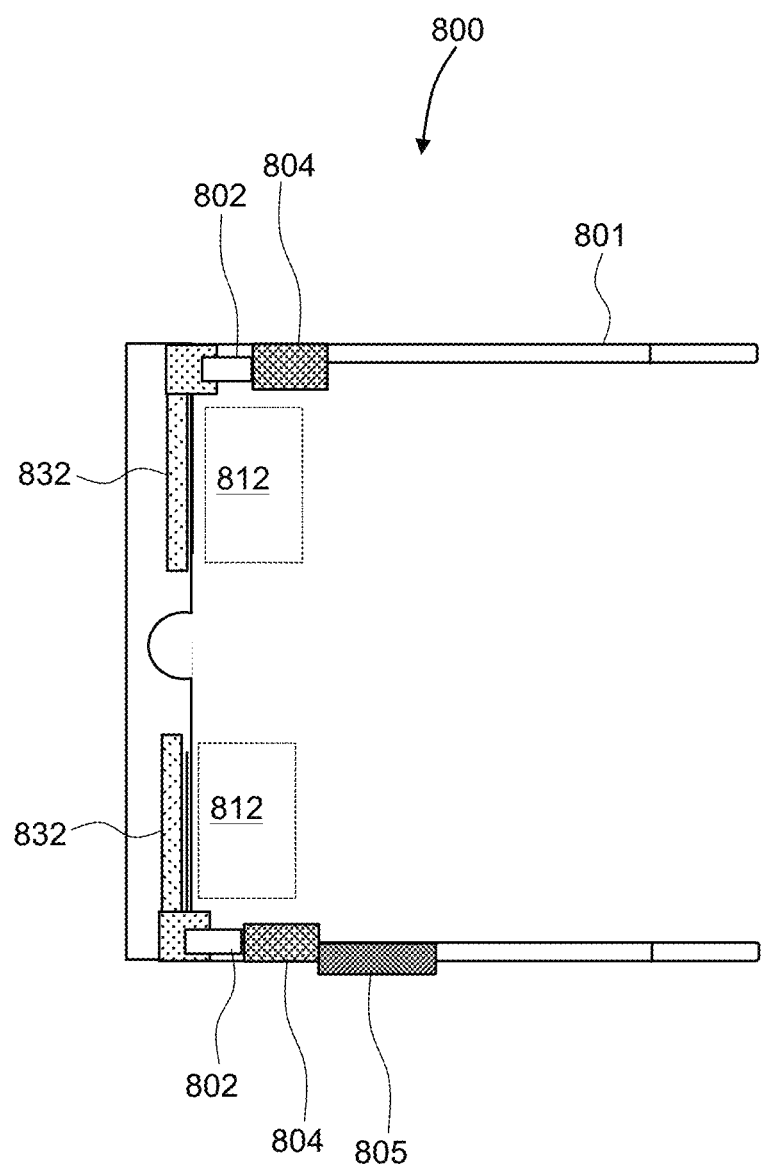
FIG. 8 is a schematic top view of a near-eye display using beam scanners of this disclosure.

Turning to FIG. 8, a near-eye display (NED) 800 includes a frame 801 having a form factor of a pair of glasses. The frame 801 may support, for each eye: a projector 802 for providing display light carrying an image in angular domain, an electronic driver 804 operably coupled to the projector 802 for powering the projector 802, and a pupil replicator 832, e.g. a pupil-replicating waveguide assembly, optically coupled to the projector 802.

Each projector 802 may include a beam scanner described herein, for example and without limitation the beam scanner 80 of FIG. 1, the beam scanner 200 of FIG. 2, the beam scanner 300A of FIG. 3A, the beam scanner 300B of FIG. 3B, the beam scanner 700 of FIG. 7, etc. The tiltable reflector of such a beam scanner may include a MEMS tiltable reflector, for example. In some embodiments, each projector 802 includes the projector 120 of FIG. 1, the projector 220 of FIG. 2, the projector 320A of FIG. 3A, the projector 320B of FIG. 3B, etc. Light sources for these projectors may include a substrate supporting an array of single-emitter or multi-emitter semiconductor light sources, e.g. side-emitting laser diodes, vertical-cavity surface-emitting laser diodes, SLEDs, or light-emitting diodes, for providing a plurality of light beams. Collimators of the light sources may include concave mirrors, bulk lenses, Fresnel lenses, holographic lenses, freeform prisms, etc. The pupil replicators 832 may include waveguides equipped with a plurality of surface relief and/or volume holographic gratings. The function of the pupil replicators 832 is to provide multiple laterally offset copies of the display light beams provided by the projectors 802 at respective eyeboxes 812.

A controller 805 is operably coupled to the light sources and tiltable reflectors of the projectors 802. The controller 805 may be configured to determine the X- and Y-tilt angles of the tiltable reflectors of the projectors 802. The controller 805 determines which pixel or pixels of the image to be displayed correspond to the determined X- and Y-tilt angles. Then, the controller 805 determines the brightness and/or color of these pixels, and operates the electronic drivers 804 accordingly for providing powering electric pulses to the light sources of the projectors 802 to produce light pulses at power level(s) corresponding to the determined pixel brightness and color.

In some embodiments, the controller 805 may be configured to operate, for each eye, the tiltable reflector to cause the light beam reflected from the tiltable reflector to have a beam angle corresponding to a pixel of an image to be displayed. The controller 805 may be further configured to operate the light source in coordination with operating the tiltable reflector, such that the light beam has brightness and/or color corresponding to first pixel being displayed. In multi-light source/multi-emitter embodiments, the controller 805 may be configured to operate the corresponding light sources/emitters in coordination, to provide a larger FOV, an improved scanning resolution, increased brightness of the display, etc., as described herein. For example, in embodiment where the projectors for both of user's eyes each include two light sources, the controller may be configured to operate each of the two tiltable reflector to cause the second light beam reflected from the tiltable reflector to have a beam angle corresponding to a second pixel of an image to be displayed, and operate the second light source in coordination with operating the tiltable reflector, such that the second light beam has brightness corresponding to the second pixel.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 9A:
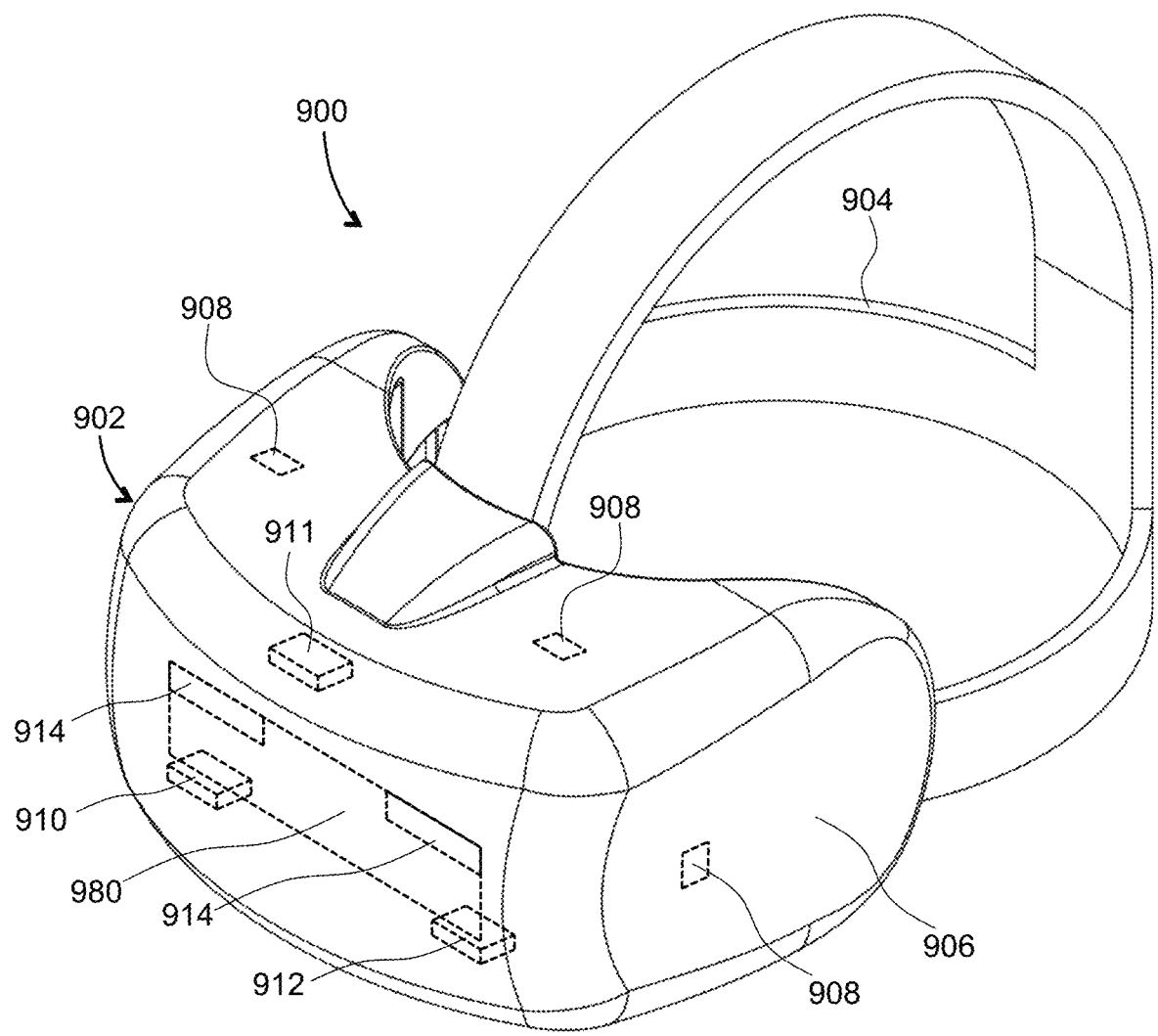
FIG. 9A is an isometric view of a head-mounted display of this disclosure.

Referring to FIG. 9A, an HMD 900 is an example of an AR/VR wearable display system which encloses the user's face, for a greater degree of immersion into the AR/VR environment. The HMD 900 is an embodiment of the near-eye display 140 of FIG. 1, the near-eye display 240 of FIG. 2, the near-eye display 340A of FIG. 3A, the near-eye display 340B of FIG. 3B, or the scanning projector display 600 of FIGS. 6A and 6B, for example. The function of the HMD 900 is to augment views of a physical, real-world environment with computer-generated imagery, and/or to generate the entirely virtual 3D imagery. The HMD 900 may include a front body 902 and a band 904. The front body 902 is configured for placement in front of eyes of a user in a reliable and comfortable manner, and the band 904 may be stretched to secure the front body 902 on the user's head. A display system 980 may be disposed in the front body 902 for presenting AR/VR imagery to the user. Sides 906 of the front body 902 may be opaque or transparent.

In some embodiments, the front body 902 includes locators 908 and an inertial measurement unit (IMU) 910 for tracking acceleration of the HMD 900, and position sensors 912 for tracking position of the HMD 900. The IMU 910 is an electronic device that generates data indicating a position of the HMD 900 based on measurement signals received from one or more of position sensors 912, which generate one or more measurement signals in response to motion of the HMD 900. Examples of position sensors 912 include: one or more accelerometers, one or more gyroscopes, one or more magnetometers, another suitable type of sensor that detects motion, a type of sensor used for error correction of the IMU 910, or some combination thereof. The position sensors 912 may be located external to the IMU 910, internal to the IMU 910, or some combination thereof.

The locators 908 are traced by an external imaging device of a virtual reality system, such that the virtual reality system can track the location and orientation of the entire HMD 900. Information generated by the IMU 910 and the position sensors 912 may be compared with the position and orientation obtained by tracking the locators 908, for improved tracking accuracy of position and orientation of the HMD 900. Accurate position and orientation is important for presenting appropriate virtual scenery to the user as the latter moves and turns in 3D space.

The HMD 900 may further include a depth camera assembly (DCA) 911, which captures data describing depth information of a local area surrounding some or all of the HMD 900. To that end, the DCA 911 may include a laser radar (LIDAR), or a similar device. The depth information may be compared with the information from the IMU 910, for better accuracy of determination of position and orientation of the HMD 900 in 3D space.

The HMD 900 may further include an eye tracking system 914 for determining orientation and position of user's eyes in real time. The obtained position and orientation of the eyes also allows the HMD 900 to determine the gaze direction of the user and to adjust the image generated by the display system 980 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 902.

Figure 9B:
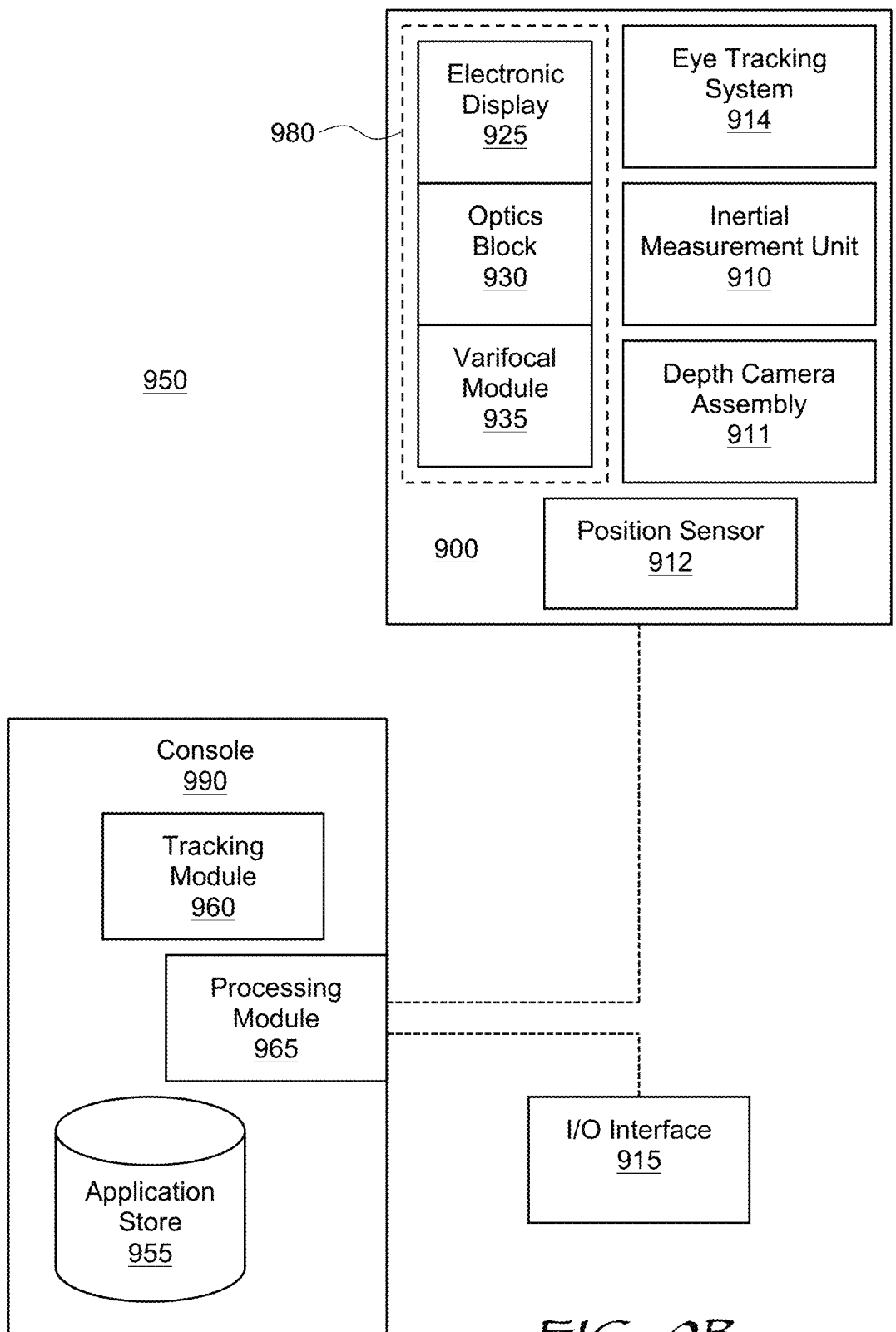
FIG. 9B is a block diagram of a virtual reality system including the headset of FIG. 9A.

Referring to FIG. 9B, an AR/VR system 950 includes the HMD 900 of FIG. 9A, an external console 990 storing various AR/VR applications, setup and calibration procedures, 3D videos, etc., and an input/output (I/O) interface 915 for operating the console 990 and/or interacting with the AR/VR environment. The HMD 900 may be "tethered" to the console 990 with a physical cable, or connected to the console 990 via a wireless communication link such as Bluetooth®, Wi-Fi, etc. There may be multiple HMDs 900, each having an associated I/O interface 915, with each HMD 900 and I/O interface(s) 915 communicating with the console 990. In alternative configurations, different and/or additional components may be included in the AR/VR system 950. Additionally, functionality described in conjunction with one or more of the components shown in FIGS. 9A and 9B may be distributed among the components in a different manner than described in conjunction with FIGS. 9A and 9B in some embodiments. For example, some or all of the functionality of the console 990 may be provided by the HMD 900, and vice versa. The HMD 900 may be provided with a processing module capable of achieving such functionality.

As described above with reference to FIG. 9A, the HMD 900 may include the eye tracking system 914 (FIG. 9B) for tracking eye position and orientation, determining gaze angle and convergence angle, etc., the IMU 910 for determining position and orientation of the HMD 900 in 3D space, the DCA 911 for capturing the outside environment, the position sensor 912 for independently determining the position of the HMD 900, and the display system 980 for displaying AR/VR content to the user. The display system 980 includes (FIG. 9B) an electronic display 925, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 980 further includes an optics block 930, whose function is to convey the images generated by the electronic display 925 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 980 may further include a varifocal module 935, which may be a part of the optics block 930. The function of the varifocal module 935 is to adjust the focus of the optics block 930 e.g. to compensate for vergence-accommodation conflict, to correct for vision defects of a particular user, to offset aberrations of the optics block 930, etc.

The I/O interface 915 is a device that allows a user to send action requests and receive responses from the console 990. An action request is a request to perform a particular action. For example, an action request may be an instruction to start or end capture of image or video data or an instruction to perform a particular action within an application. The I/O interface 915 may include one or more input devices, such as a keyboard, a mouse, a game controller, or any other suitable device for receiving action requests and communicating the action requests to the console 990. An action request received by the I/O interface 915 is communicated to the console 990, which performs an action corresponding to the action request. In some embodiments, the I/O interface 915 includes an IMU that captures calibration data indicating an estimated position of the I/O interface 915 relative to an initial position of the I/O interface 915. In some embodiments, the I/O interface 915 may provide haptic feedback to the user in accordance with instructions received from the console 990. For example, haptic feedback can be provided when an action request is received, or the console 990 communicates instructions to the I/O interface 915 causing the I/O interface 915 to generate haptic feedback when the console 990 performs an action.

The console 990 may provide content to the HMD 900 for processing in accordance with information received from one or more of: the IMU 910, the DCA 911, the eye tracking system 914, and the I/O interface 915. In the example shown in FIG. 9B, the console 990 includes an application store 955, a tracking module 960, and a processing module 965. Some embodiments of the console 990 may have different modules or components than those described in conjunction with FIG. 9B. Similarly, the functions further described below may be distributed among components of the console 990 in a different manner than described in conjunction with FIGS. 9A and 9B.

The application store 955 may store one or more applications for execution by the console 990. An application is a group of instructions that, when executed by a processor, generates content for presentation to the user. Content generated by an application may be in response to inputs received from the user via movement of the HMD 900 or the I/O interface 915. Examples of applications include: gaming applications, presentation and conferencing applications, video playback applications, or other suitable applications.

The tracking module 960 may calibrate the AR/VR system 950 using one or more calibration parameters and may adjust one or more calibration parameters to reduce error in determination of the position of the HMD 900 or the I/O interface 915. Calibration performed by the tracking module 960 also accounts for information received from the IMU 910 in the HMD 900 and/or an IMU included in the I/O interface 915, if any. Additionally, if tracking of the HMD 900 is lost, the tracking module 960 may re-calibrate some or all of the AR/VR system 950.

The tracking module 960 may track movements of the HMD 900 or of the I/O interface 915, the IMU 910, or some combination thereof. For example, the tracking module 960 may determine a position of a reference point of the HMD 900 in a mapping of a local area based on information from the HMD 900. The tracking module 960 may also determine positions of the reference point of the HMD 900 or a reference point of the I/O interface 915 using data indicating a position of the HMD 900 from the IMU 910 or using data indicating a position of the I/O interface 915 from an IMU included in the I/O interface 915, respectively. Furthermore, in some embodiments, the tracking module 960 may use portions of data indicating a position or the HMD 900 from the IMU 910 as well as representations of the local area from the DCA 911 to predict a future location of the HMD 900. The tracking module 960 provides the estimated or predicted future position of the HMD 900 or the I/O interface 915 to the processing module 965.

The processing module 965 may generate a 3D mapping of the area surrounding some or all of the HMD 900 ("local area") based on information received from the HMD 900. In some embodiments, the processing module 965 determines depth information for the 3D mapping of the local area based on information received from the DCA 911 that is relevant for techniques used in computing depth. In various embodiments, the processing module 965 may use the depth information to update a model of the local area and generate content based in part on the updated model.

The processing module 965 executes applications within the AR/VR system 950 and receives position information, acceleration information, velocity information, predicted future positions, or some combination thereof, of the HMD 900 from the tracking module 960. Based on the received information, the processing module 965 determines content to provide to the HMD 900 for presentation to the user. For example, if the received information indicates that the user has looked to the left, the processing module 965 generates content for the HMD 900 that mirrors the user's movement in a virtual environment or in an environment augmenting the local area with additional content. Additionally, the processing module 965 performs an action within an application executing on the console 990 in response to an action request received from the I/O interface 915 and provides feedback to the user that the action was performed. The provided feedback may be visual or audible feedback via the HMD 900 or haptic feedback via the I/O interface 915.

In some embodiments, based on the eye tracking information (e.g., orientation of the user's eyes) received from the eye tracking system 914, the processing module 965 determines resolution of the content provided to the HMD 900 for presentation to the user on the electronic display 925. The processing module 965 may provide the content to the HMD 900 having a maximum pixel resolution on the electronic display 925 in a foveal region of the user's gaze. The processing module 965 may provide a lower pixel resolution in other regions of the electronic display 925, thus lessening power consumption of the AR/VR system 950 and saving computing resources of the console 990 without compromising a visual experience of the user. In some embodiments, the processing module 965 can further use the eye tracking information to adjust where objects are displayed on the electronic display 925 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A display comprising:
    a light source for providing a light beam having a characteristic comprising at least one of brightness or color;
    a beam scanner comprising:
        a substrate;
        a tiltable reflector hingedly supported by the substrate;
        a first folding mirror extending from the substrate, wherein the first folding mirror is configured to receive and redirect the light beam; and
        a reflective polarizer supported over the tiltable reflector and configured to receive the light beam from the first folding mirror and to further redirect the light beam towards the tiltable reflector for scanning the light beam; and
    a waveguide configured to receive the light beam reflected from the tiltable reflector, and to spread the light beam over an eyebox of the display;
    wherein the light source and the beam scanner are disposed on opposite sides of the waveguide.

2. The display of claim 1, wherein the waveguide is substantially parallel to the substrate of the beam scanner.

3. The display of claim 1, further comprising a second folding mirror configured to receive and redirect the light beam towards the first folding mirror and around the waveguide.

4. The display of claim 1, further comprising a controller operably coupled to the light source and the beam scanner for varying the characteristic of the light beam in coordination with scanning the light beam by the beam scanner.

5. The display of claim 1, further comprising a quarter-wave waveplate (QWP) in an optical path between the reflective polarizer and the tiltable reflector, wherein the QWP is configured to change a polarization state of the light beam to an orthogonal polarization state upon double pass propagation of the light beam through the QWP.

6. The display of claim 5, wherein the QWP is supported by the reflective polarizer.

7. The display of claim 1, wherein the beam scanner further comprises an enclosure of the tiltable reflector and the first folding mirror.

8. The display of claim 7, wherein the enclosure comprises a hermetic enclosure.

9. The display of claim 7, wherein the enclosure comprises an optical window in an optical path upstream of the first folding mirror.

10. The display of claim 1, wherein the tiltable reflector is tiltable about two orthogonal axes.

11. The display of claim 1, wherein the tiltable reflector comprises a microelectromechanical system (MEMS) tiltable reflector.

12. The display of claim 1, wherein the light source comprises a laser diode.

13. The display of claim 1, wherein the light source comprises a multi-emitter assembly.

* * * * *